United States Patent [19]
Cisternino

[11] Patent Number: 4,676,597
[45] Date of Patent: Jun. 30, 1987

[54] IMAGING MONOCHROMATOR
[75] Inventor: Francesco Cisternino, Turin, Italy
[73] Assignee: Cselt-Centro Studi e Laboratori Telecomunicazioni S.p.A., Turin, Italy
[21] Appl. No.: 688,296
[22] Filed: Jan. 2, 1985
[30] Foreign Application Priority Data
Jan. 20, 1984 [IT] Italy ................ 67054 A/84
[51] Int. Cl.⁴ ............................. G02B 5/04
[52] U.S. Cl. ................................. 350/168
[58] Field of Search ............ 350/162.17, 168, 286; 356/331, 332, 333, 334

[56] References Cited
U.S. PATENT DOCUMENTS

| | | | |
|---|---|---|---|
| 1,858,361 | 5/1932 | Desirello | 350/286 |
| 2,818,765 | 1/1958 | Foster | 350/286 |
| 3,048,080 | 11/1962 | White | 356/331 |
| 3,958,884 | 5/1976 | Smith . | |
| 4,355,898 | 10/1982 | Dakin | 350/162.17 |
| 4,455,087 | 6/1984 | Allemand et al. . | |

*Primary Examiner*—John K. Corbin
*Assistant Examiner*—Vincent J. Lemmo
*Attorney, Agent, or Firm*—Karl F. Ross; Herbert Dubno

[57] ABSTRACT

The monochromator presents, in the plane of the slit (5), a mirror (6) which reflects the radiations comprised within the spectrum portion selected by the slit (5) towards the grating (3) dispersing a non-monochromatic beam. The radiations reflected recombine into a single, substantially monochromatic beam on the grating (3), and a suitable optical system (7,8) focuses such a beam forming the substantially monochromatic image of the source (1).

9 Claims, 2 Drawing Figures

IMAGING MONOCHROMATOR

FIELD OF THE INVENTION

Background of the Invention

The present invention relates to optical measurement equipment and, more particularly, relates to an imaging monochromator.

The use of a monochromator is necessary whenever non-monochromatic radiation is to be split up into its constituents and a spectrum portion is to be isolated. In conventional monochromators this entails not obtaining an image of the source, and in fact in the slit plane a plurality of source images (or a continuous sequence of images, in case of a continuous spectrum source) are formed which overlap and are laterally shifted from one another.

In a number of cases, a recognizable image of the source in the various monochromatic radiations may be necessary: this is for instance the case of those measurements on optical fibers, in which the generally non-monochromatic light outgoing from a first fiber (source fiber) is launched into a fiber under test, upon selection of the different wavelengths (more particularly measurements exploiting Raman effect in the source fiber, such as pulse propagation time measurement, attenuation measurements by backscattering, etc.). Hence, these types of measurements require the separation of the different radiations before these are launched towards the device under test.

The use of conventional monochromators for this purpose is hindered not only for the reason given above, but also by the fact that they use off-axis mirrors, which give rise to astigmatism aberration: this results in a rather broadened image, with highly reduced intensity with respect to the actual source (e.g. by a factor $10^3-10^4$). Such a reduced power can be insufficient to effect the measurements, chiefly in case of backscattering measurements in which only a very small fraction of the power launched into the fiber is backscattered and collected for the measurement.

No solution to these problems is described in the literature. Rather the problem is by-passed by inserting a commercial monochromator at the output of the fiber under test. This means that the output beam instead of the input beam is dispersed. This procedure does not entail too serious problems for propagation measurements, as the light is collected upon a photodetector of approximately the same size as that of the image formed by the monochromator. On the contrary it cannot be used for backscattering measurements, as the presence of different wavelength radiations gives rise to non-linear phenomena in the fiber, which affect the measurement itself.

OBJECT OF THE INVENTION

It is the object of the invention to overcome these disadvantages and provide a device which allows perfect image formation (limited only by diffraction) by eliminating the image multiplication due to dispersion as well as the astigmatism, provides a power sufficient to backscattering measurements and eliminates the problems inherent in the propagation of more radiations.

SUMMARY OF THE INVENTION

The monochromator of the invention comprises a first optical system collimating a light beam emitted by a non-monochromatic source upon a beam dispersing means, and a second optical system which focuses the dispersed beam onto an image plane where an adjustable-width slit allows a substantially monochromatic portion of the source spectrum to be isolated. According to the invention in the plane of said slit there is provided a mirror for reflecting the radiations comprised in the spectrum portion towards the second optical system and the dispersing means, the dispersing means recombining the radiations comprised in said spectrum portion.

Advantageously the beam dispersing means is mounted on a support which allows its rotation about an axis in order to vary the spectrum portion collected by the slit, and the rotation axis of the dispersing means lies in the focal plane of the second optical system.

BRIEF DESCRIPTION OF THE DRAWING

The invention will become more apparent with reference to the annexed drawing, in which.

SPECIFIC DESCRIPTION

Figure 1:
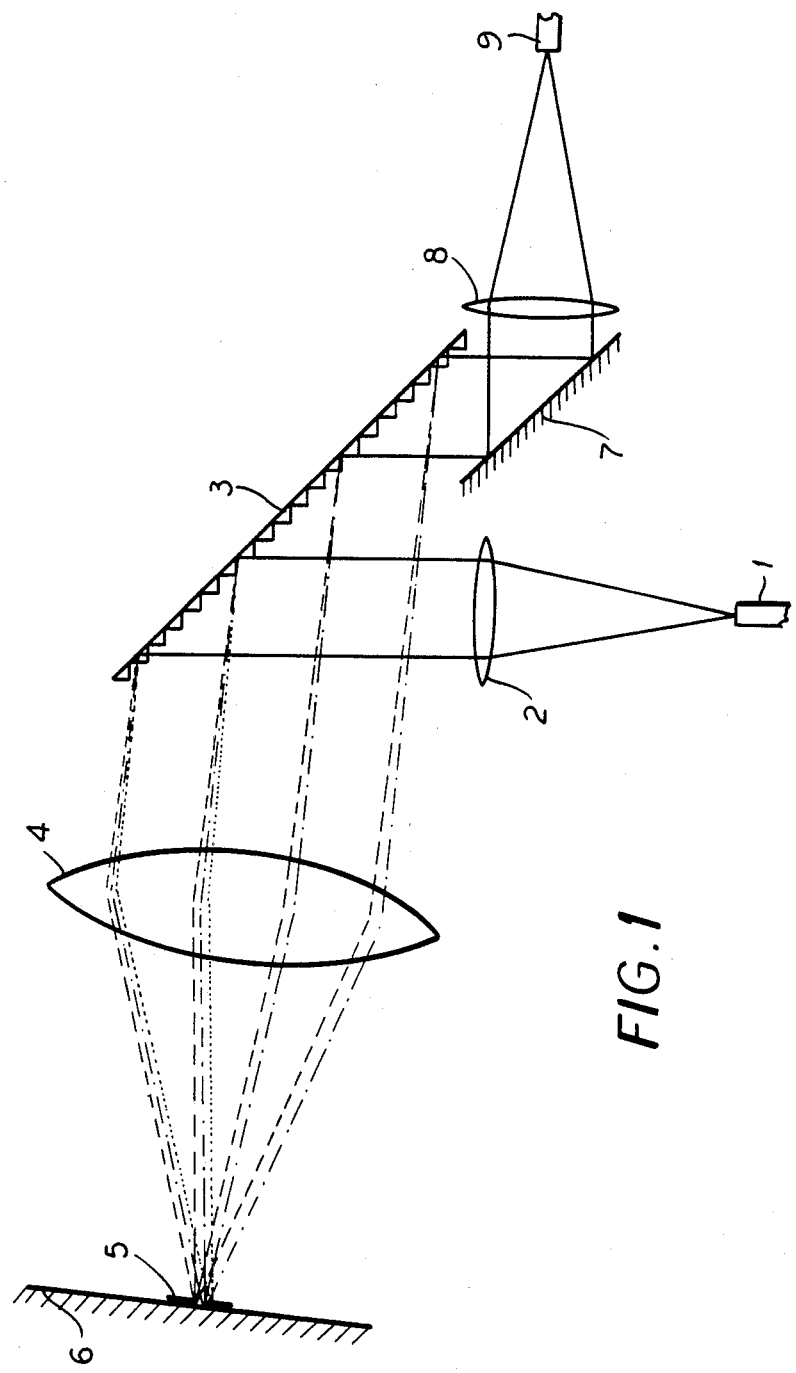
FIG. 1 is an optical-path diagram showing in a schematic form the device according to the invention.
Figure 2:
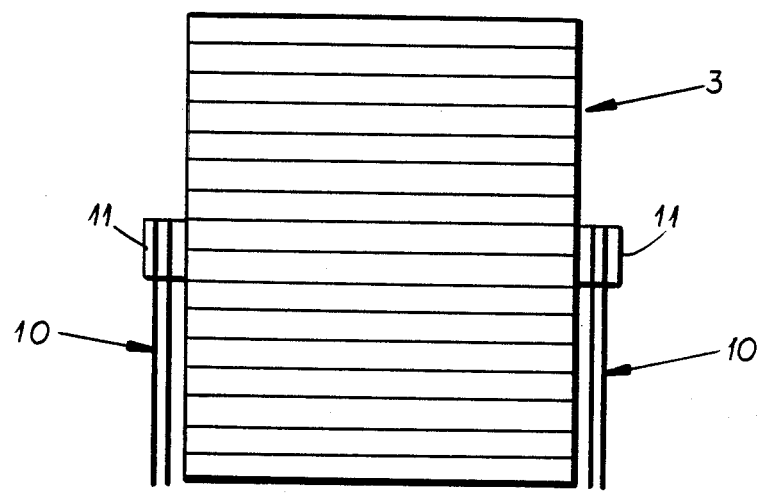
FIG. 2 is an elevational view of the grating showing the means for rotating same.

In FIG. 1 the light of a non-monochromatic light source 1 (e.g. the output end of a monomode-fiber) is collimated by a first optical system 2 (e.g. a microscope objective) on the surface of a grating 3 (more particularly a reflection grating) or another device capable of causing the dispersion of the beam emitted by the source 1. The different monochromatic radiations obtained from grating 3 (shown by different broken lines) are collected by a second optical system 4 (more particularly an achromatic doublet), and on a focal plane of that system there is placed a slit 5 allowing the separation of basically monochromatic portions of the spectrum of source 1. As is common practice in monochromators, slit 5, of adjustable width, is fixed and the selection of the desired spectrum portion is obtained by rotating grating 3. For the sake of simplicity the means (10) for grating rotation are shown; in FIG. 2 they are identical to those allowing the rotation of the dispersing element of commercial monochromators.

To allow the image formation according to the present invention, a mirror 6, reflecting towards optical system 2 the radiations of the spectrum portion isolated by the slit, is located in a plane substantially coincident with that of slit 5.

Due to optical path reversibility, the radiations recombine on grating 3; the substantially monochromatic beam recombined on the grating can be then sent towards the utilization device.

If the beam emitted by source 1 is centered with respect to grating 3, beam splitters could be used to separate such a beam from the one obtained from recombination; yet, these splitters exploit only some of the available power. Advantageously, according to the present invention, grating 3 and optical system 4 have in section a size at least equal to twice the transversal size of the incident beam, and source 1 and the first optical system 2 are off-axis with respect to the grating. In this way the beam emitted by source 1 can be made to impinge on a first half of the surface of grating 3, while the beam reflected by mirror 6, taking into account grating inclination with respect to the mirror, impinges on the other half of the grating. By means of a mirror 7, dimensioned so as not to intercept the beam emitted by source 1, the recombined beam can be sent towards a third optical system 8 (in particular another microscope objective) forming the monochromatic image of source 1 on the device under test 9 (e.g. an optical fiber).

As the spectrum portion isolated by the slit is generally not exactly monochromatic, the beam recombination on the grating might be imperfect, so that parallel and separated monochromatic beams might be obtained. This can be prevented if grating 3 is at focal distance from optical system 4; of course, owing to the grating inclination with respect to the main plane of the optical system, not all the grating points can satisfy the above condition.

By applying geometrical optics laws, it can be seen that ray recombination is correct if the grating rotation axis belongs to the grating itself and lies at the focal distance from the lens; under these conditions dispersion and recombination centers are in symmetrical positions with respect to such an axis and lie on the grating surface.

It is to be appreciated that, by a suitable choice of the optical systems, in particular an achromatic doublet 4, the invention can be applied not only to visible radiations but also to invisible ones in particular to infrared radiations as may be required for the applications above.

I claim:

1. A monochromator, comprising:
   a first optical system for collimating a non-monochromatic light beam emitted by a source;
   dispersing means positioned to receive the non-monochromatic light beam collimated by said source and dispersing same;
   a second optical system positioned to collect the radiation of the beam dispersed by said dispersing means for focussing the collected dispersed beam on an image plane;
   means forming a slit of adjustable width along said image plane for isolating from the radiation focussed by said second optical system a substantially monochromatic portion of the spectrum of said source; and
   a first reflecting element located substantially in the plane of said slit to reflect radiation of the isolated portion of said spectrum toward said second optical system and said dispersing means, said dispersing means being constructed and arranged to recombine the radiation reflected by said first reflecting element into a single beam to form a substantially monochromatic image of said source.

2. The monochromator defined in claim 1 wherein said dispersing means is a grating and has a rotation axis enabling rotation of said grating about said axis, said axis being positioned at a distance from said second optical system equal to the focal distance thereof.

3. The monochromator defined in claim 2 wherein said source and said first optical system are so positioned that the beam collimated by said first optical system is collected by a first portion of the surface of said dispersing means, while the beam formed by recombination of radiation reflected by said first reflecting element is recombined on a second portion of the surface of said dispersing means distinct from the first portion thereof.

4. The monochromator defined in claim 3, further comprising:
   a second reflecting element located and positioned along a path of the beam formed by recombination of radiation reflected by said first reflecting element; and
   a third optical system in the path of a beam reflected by said second reflecting element and which forms said substantially monochromatic image of said source.

5. The monochromator defined in claim 2 wherein said grating is mounted on a support enabling its rotation about said axis located at said focal distance from said second optical system.

6. The monochromator defined in claim 5 wherein said source and said first optical system are so positioned that the beam collimated by said first optical system is collected by a first portion of the surface of said dispersing means, while the beam formed by recombination of radiation reflected by said first reflecting element is recombined on a second portion of the surface of said dispersing means distinct from the first portion thereof.

7. The monochromator defined in claim 6, further comprising:
   a second reflecting element located and positioned along a path of the beam formed by recombination of radiation reflected by said first reflecting element; and
   a third optical system in the path of a beam reflected by said second reflecting element and which forms said substantially monochromatic image of said source.

8. The monochromator defined in claim 1 wherein said source and said first optical system are so positioned that the beam collimated by said first optical system is collected by a first portion of the surface of said dispersing means, while the beam formed by recombination of radiation reflected by said first reflecting element is recombined on a second portion of the surface of said dispersing means distinct from the first portion thereof.

9. The monochromator defined in claim 8, further comprising:
   a second reflecting element located and positioned along a path of the beam formed by recombination of radiation reflected by said first reflecting element; and
   a third optical system in the path of a beam reflected by said second reflecting element and which forms said substantially monochromatic image of said source.

* * * * *